United States Patent [19]

Pieper et al.

[11] Patent Number: 4,871,631
[45] Date of Patent: Oct. 3, 1989

[54] ADHESIVELY SECURABLE MULTILAYER RELIEF PLATE FOR FLEXOGRAPHIC PRINTING

[75] Inventors: Hartwig Pieper, Frankenthal; Reiner Michels, Neunkirchen; Heinz-Ulrich Werther, Wachenheim, all of Fed. Rep. of Germany

[73] Assignee: BASF Aktiengesellschaft, Ludwigshafen, Fed. Rep. of Germany

[21] Appl. No.: 110,868

[22] Filed: Oct. 21, 1987

[51] Int. Cl.$^4$ ............................................. B41N 1/12
[52] U.S. Cl. ........................................ 430/14; 430/18; 430/306; 430/271; 101/395
[58] Field of Search ................ 430/271, 14, 18, 306; 101/395

[56] References Cited

U.S. PATENT DOCUMENTS

| | | | |
|---|---|---|---|
| 2,294,879 | 9/1942 | Affelder | 101/382 R |
| 2,334,820 | 11/1943 | Hawley | 101/349 |
| 2,679,969 | 6/1954 | Richter | 101/426 |
| 3,128,700 | 4/1964 | Kunetika | 101/401.1 |
| 3,554,836 | 1/1971 | Steindorf | 101/426 |
| 3,705,072 | 12/1972 | Rosvold | 101/401.1 |
| 3,903,794 | 9/1975 | Grupe | 101/401.1 |
| 3,948,665 | 4/1976 | Richter et al. | 430/271 |
| 3,990,897 | 11/1976 | Zuerger et al. | 430/273 |
| 4,574,697 | 3/1986 | Feeley | 101/401.1 |

FOREIGN PATENT DOCUMENTS 447302  5/1936  United Kingdom ............... 101/129

Primary Examiner—Clifford D. Crowder
Attorney, Agent, or Firm—Keil & Weinkauf

[57] ABSTRACT

A flexographic printing relief-plate, which has a relief layer (P), an interlayer (Z) and a base layer (U), is provided with a double-sided adhesive sheet (W). The double-sided adhesive sheet (W) transmits actinic light and is firmly bonded to the base layer (U) on one side. On the opposing side, the adhesive sheet (W) has an adhesive force of from 1 to 6 N/25 mm. This force is less than the adhesive force on the side bonded to the base layer (U). The adhesive sheet (W) permits the flexographic relief printing plate to be repeatedly adhered to and removed from the printing cylinder without damaging the plate.

3 Claims, 1 Drawing Sheet

ADHESIVELY SECURABLE MULTILAYER RELIEF PLATE FOR FLEXOGRAPHIC PRINTING

BACKGROUND OF THE INVENTION

The present invention relates to a method of fixing a multilayer relief plate for flexographic printing to a printing cylinder.

It has been disclosed that multilayer relief plates for flexographic printing can be fixed to metal cylinders of printing presses using double sided adhesive sheets (cf. for example DE-A-No. 2,215,090 and GB-A-No. 1,366,769). Adhesive sheets of this type range in general from 100 to 500 $\mu$m in thickness, so that tolerances are likely to be as high as 50 $\mu$m, sufficient to prevent a clean impression.

Using such a double sided adhesive sheet a relief printing plate is generally mounted by first adhesively bonding one side of the adhesive sheet to the metal cylinder and then, by hand, placing and fixing the flexographic printing plate on the free adhesive surface to a high accuracy of register, which can be rather time-consuming.

In disassembly, the relief printing plate is peeled off the cylinder and stored for reuse, if required, when it will again be attached to a metal cylinder fitted with double sided adhesive sheet. After use the adhesive sheets are generally not reusable, and the cylinder needs to be cleaned of any still adherent adhesive. Since in disassembly, the forces required for peeling the printing plate off the adhesive sheet are fairly high, there is a danger that in the course of disassembly the printing plate will be damaged or destroyed by creases in the stabilizing layer (=inter-layer Z).

It is an object of the present invention to avoid the disadvantages described above and to present a method of fixing a multilayer relief plate to a printing cylinder without having to use the hitherto customary double sided adhesive sheet mounted on the cylinder, on the one hand, while making it possible to print within tolerances of $<\pm10$ $\mu$m, on the other. In addition, satisfactory removal of the printing plate from the printing cylinder should require minimal force, not damage the plate or destroy the bond between adhesive layer and printing plate and leave behind no residue of printing plate or soiling on the printing cylinder.

We have found that, suprisingly, this object is achieved by applying a layer of contact adhesive having an adhesive force from 1 to 6 N/25 mm to the base layer of the multilayer relief printing plate.

DETAILED DESCRIPTION OF THE PREFERRED EMBODIMENT

Figure 1:
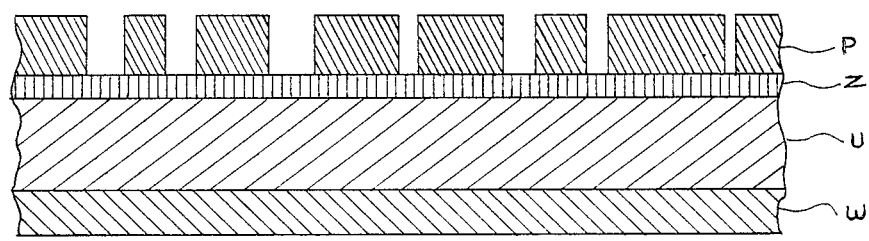
FIG. 1 is a cross section of a preferred embodiment of a multilayer relief plate in accordance with the present invention.

The present invention accordingly is a multilayer relief plate for flexographic printing. The relief plate is composed of a base layer (U) comprising an elastomeric material, a relief layer (P) obtained by photocrosslinking by irradiation with actinic light a mixture which, before photocrosslinking, contained a mixture of from 50 to 99% by weight of an elastomer and from 1 to 50% by weight of one or more photopolymerizable olefinically unsaturated monomers substantially compatible with the elastomer, and, applied between base layer (U) and relief layer (P), in each case by means of thin adhesion-promoting layers, an interlayer (Z) which is insoluble in and impermeable to the developer solvent used in relief-making and the printing ink solvents, wherein the side of the base layer (U) remote from the interlayer (Z) has been provided with a layer of contact adhesive which transmits actinic light and which on one side is firmly bonded to the base layer (U) and has on the other side an adhesive force of from 1 to 6 N/25 mm with which the relief printing plate is fixed to the printing cylinder.

A preferred way of working the multilayer relief plate according to the invention comprises using as a layer of contact adhesive, a double sided adhesive sheet (W) which has a higher adhesive force on the side adhesively bonded to the base layer (U) than on the printing cylinder facing side.

It is also preferable for the layer of contact adhesive (W) to be from 5 to 100, in particular from 10 to 50, $\mu$m in thickness.

Laminates and multilayer relief plates for flexographic printing are described for example in DE-A-No. 2,300,371, DE-A-No. 2,301,175, U.S. Pat. No. 3,556,791 and DE-A-No. 2,444,118.

In what follows, the structure of laminates and of the relief plates obtainable therefrom will be discussed in detail.

Suitable elastomeric materials for the base layer (U) are for example natural rubber, polybutadienes, butadiene-acrylonitrile copolymers, butadiene-styrene copolymers, silicone rubber, polysulfide rubber, vinylidene chloride/ hexafluoropropylene copolymers, isoprenestyrene and butadiene-styrene block copolymers and in particular polyurethane elastomers which can be obtained in a conventional manner from high molecular weight polyhydroxy compounds, such as polyesters or polyethers, possibly low molecular weight polyols, and also polyisocyanates, in particular diisocyanates. Reference is made for example to the statements in Saunders-Frisch, Polyurethanes, Part II, Chapter IX, Interscience Publishers Inc., New York, 1964. The materials for the base layer (U) should advantagously be processible into low-tolerance layers, for example by casting and hardening in molds or heatable cnetrifuges or in the case of thermoplastic materials for example by calendering. It is further possible to prepare the base layer (U) from foam-like materials or to use foams for that purpose, provided they have the required elasticity and do not exert any sponge effect (absorbency) on the printing ink solvents or developer solvents. Preferably, the materials making up the base layer (U) are only sparingly soluble, if at all, in the developer solvents for the relief layer.

The base layer (U) can in general be from 0.5 to 6 mm in thickness. It is preferably made of materials which have a modulus of elasticity of from 1 to 20 N/mm$^2$.

The interlayer or barrier layer (Z) can be made of plastics films, metal foils or crosslinked surface coatings which may also be reinforced by fabric, for example a textile or glassfiber fabric. Interlayers (Z) can thus be produced by impregnating glassfiber fabrics with crosslinkable polymers or monomers or mixturs thereof, for example by impregnating with unsaturated polyester resins and crosslinking these after or during shaping. The interlayers (Z) can for example range in thickness from about 5 to 500 $\mu$m, in particular from 10 to 200 $\mu$m, and have a modulus of elasticity of from $1\times10^2$ to $2.1\times10^5$ N/mm$^2$. Furthermore, the interlayers (Z)

should be insoluble in, substantially unswellable by and substantially impermeable to the solvents used for developing the relief after exposure to light and the organic solvents customarily present in printing inks. Typical solvents of this kind are alcohols, such as ethanol or isopropanol, esters, such as ethyl acetate, hydrocarbons and ketones, such as acetone or methyl ethyl ketone.

The interlayer (Z) is preferably made of polymer films and in particular polyester films, such as polyethylene terephthalate films, especially biaxially oriented polyethylene terephthalate films. Overall, preference is given to those interlayers (Z) which are transparent to visible light, thereby facilitating positioning of the plate on the plate cylinder, and in particular to those which also transmit the actinic light which activates the photocrosslinkable layer, specifically the photoinitiator resin, ie., in general, light down to a wavelength of about 320 $\mu$m, and thereby make it possible, for example, to preexpose the photocrosslinkable layer from the rear of the plate.

The photocrosslinkable layer, ie. the relief layer (P), can in principle be made of any of the elastomer-monomer mixtures known for photopolymer plates for flexographic printing, provided that, in the photocrosslinked state following full tone exposure, they are no longer soluble in the developer solvent. Preferably, the photo-crosslinked layer (P) (relief layer P) has a modulus of elasticity the same as or preferably higher than that of the base layer (U). The modulus of elasticity of the relief layer (P) (ie. of the photocrosslinked layer P) can be for example within the range from 3 to 200, preferably from 3 to 50, N/mm$^2$. This can easily be ascertained in a few preliminary experiments. Suitable elastomers for the photocrosslinkable layer can be most of the elastomer materials mentioned above for the layer (U), or blends thereof, provided they are soluble in the developer solvent. Very suitable materials are elastomeric butadiene or isoprene block copolymers and elastomeric polyether urethanes and polyester urethanes, in particular polyurethane elastomers prepared by reacting an aliphatic saturated polyester glycol having a molecular weight of from 400 to 4000 with an organic diisocyanate, with or without an aliphatic diol having 2 to 10 carbon atoms as chain extender.

The monomers for the photocrosslinkable layer should be substantially compatible with the polymeric material used; they should not separate out even on prolonged storage of the mixture or layer and should be readily photopolymerizable by irradiation with actinic light in the presence of a photoinitiator. Examples of highly suitable monomers are the acrylates and in particular the diacrylates and polyacrylates and also the corresponding methacrylates of aliphatic or cycloaliphatic diols and polyols having, in general, from 2 to 20 carbon atoms, for example butane-1,4-diol diacrylate, the virtually isocyanato-free reaction products of polyisocyanates and in particular aliphatic diisocyanates of 6 to 36 carbon atoms and (methy)acrylic acid esters which have a hydroxyl group in the alkyl radical, such as butane-1,4-diol monoacrylate, and also N-vinyl compounds, in particular N-vinylpyrrolidone.

The photocrosslinkable layer further usually contains a photoinitiator, in general in amounts of from 0.01 to 10, in particular from 0.01 to 5%, by weight, such as benzoin or a benzoin derivative, for example a benzoin methyl or isopropyl ether, a ketal, such as benzil dimethyl ketal, and also acylphosphine oxide, diacylphosphine oxide or acylphosphine sulfide compounds. The photocrosslinkable layer can moreover also contain further conventional additives, such as inhibitors of thermal polymerization, such as p-methoxyphenol, hydroquinone or salts of N-nitrosocyclohexylhydroxylamine, dyes or plasticizers (to improve the processibility of the mixture used for the layer).

It is frequently of advantage for the laminates if the photocrosslinkable layer is provided with a firmly adhering thin nontacky outer layer which may for example consist of a polymer which forms hard, nontacky, transparent and tear-resistant films, for example a polyamide or copolyamide which is soluble in the developer solvent, or of a mixture of such a polymer with a small amount ($\leq 10\%$ by weight) of a photopolymerizable monomer, and also of a photoinitiator and an optional inhibitor.

This outer layer makes it possible, without using adhesive, to lay the negative flat on the plate in the production of a relief printing plate from the laminate without trapping bubbles; this is sometimes not possible in the absence of the outer layer owing to the tackiness of the surface of the photocrosslinkable layer. In the development of the exposed areas of the layer to form the relief layer (P), the outer layer is washed out together with the uncrosslinked areas of the layer.

It is also frequently advantageous to provide the outer layer with a protective cover sheet which can be peeled off, such as a polyester film; this protective cover sheet can also be applied to the photocrosslinkable layer together with the outer layer. In general, this protective cover sheet is peeled off prior to the image-wise exposure of the photocrosslinkable layer while, in general, the outer layer remains on the photocrosslinkable layer.

The layers (U), (Z) and (P) are firmly bonded to one another. The firm bond between pairs of layers is obtained by applying a thin layer of adhesion promotor or adhesive to one or both sides and firmly bonding the layers together, thereby producing thin adhesion-promoting layers between the layers (U) and (Z) and between the layers (Z) and (P) which are less than 100 $\mu$m, preferably less than 30 $\mu$m, in thickness. The adhesion-promoting layers can be obtained with commercial one-or two-component adhesives, the nature of which depends on the type of material or polymer used for the layers (U) and (Z) on the one hand and (Z) and (P) on the other. Adhesives which are frequently suitable are the commercial two-component adhesives on a polyurethane or polychloroprene basis, which can be applied in appropriate thickness to the layers to be bonded together, by coating or casting.

In relief printing plates which have proven particularly suitable, the base layer (U) is from 1,000 to 5,000 $\mu$m in thickness and has a modulus of elasticity from 1.5 to 10N/mm$^2$, the interlayer has a thickness of from 20 to 125 $\mu$m and a modulus of elasticity of from $2.5 \times 10^3$ to $10^4$ N/mm$^2$, and the photocrosslinked relief layer (P) has a thickness of from 400 to 1,000 $\mu$m and a modulus of elasticity from 3 to 50 N/mm$^2$.

According to the invention, the side of the base layer (U) remote from the interlayer (Z) is provided with a layer of contact adhesive (W) which is firmly bonded on one side to the base layer (U) and has on the other side an adhesive force of from 1 to 6 N/25 mm. This layer of contact adhesive (W) generally has a thickness of from 5 to 100, preferably from 10 to 50, $\mu$m.

Suitable contact adhesives are in particular peelable contact adhesives, for example those based on polyisobutylene, polyacrylate, polyacrylates dispersions, rubbers and the like.

Contact adhesives of this type can for example be applied to the base layer (U) of the printing plate or of the unexposed parent laminate by direct application of a uniform layer of the abovementioned thickness. If the contact adhesive has been applied to the unexposed laminate, the layer of contact adhesive is advantageously covered up with a protective sheet which transmits actinic light and, in the washing out and aftertreatment after the imagewise exposure of the laminate, either solvents which do not impair the layer of contact adhesive should be used, or appropriate precautions taken against ingress of these solvents into the layer of contact adhesive.

A further advantageous way of applying a layer of contact adhesive having an adhesive force of from 1 to 6 N/25 mm to the base layer (U) of the multilayer relief printing plate comprises fixing a double sided adhesive sheet (W) to the base layer (U) by means of one of the adhesive layers. The adhesive layer chosen generally has a higher adhesive force than the layer of contact adhesive which is present on the other side of the adhesive sheet and which has an adhesive force of from 1 to 6 N/25 mm and is used to fix the relief printing plate to the printing cylinder. That side of the double sided adhesive sheet (W) which is to be bonded to the base layer (U) can consist not only of adhesives of the abovementioned kind but also of other adhesives, for example two-component adhesives, radiation-curable adhesives, hardenable polyurethane adhesives and cellulose ester adhesives, which enter a firm bond with the base layer (U).

To store the laminate or plate bearing the layer of contact adhesive, it can be of advantage to cover the layer of contact adhesive with a protective sheet or with siliconized paper.

In the Examples which follow, parts and percentages are by weight. The modulus of elasticity is determined in accordance with German Standard Specification (DIN) No. 53,457 and the adhesive force in accordance with AFERA Test Standard No. 4,001 (peel strength) of the West German Association of Adhesive Tape Manufacturers.

EXAMPLE 1

A laminate composed of a 2 mm thick base layer (U) of a polyurethane elastomer prepared from a polyester and 2,4-toluylene diisocyanate and having a modulus of elasticity of 2.5 N/mm$^2$, an interlayer (Z) comprising a biaxially oriented polyethylene terephthalate film 75 μm in thickness having a modulus of elasticity of $4.5 \times 10^3$ N/mm$^2$ which is bonded on one side to the base layer (U) and on the other side to the photocrosslinkable layer by means of a commercial polyurethane adhesive, and a 0.7 mm thick photocrosslinkable layer comprising a mixture of 80 parts of commercial thermoplastically processable isocyanato-free polyurethane elastomer (reaction product from adipic acid/ethylene glycol polyester with diphenylmethane diisocyanate and ethylene glycol), 10 parts of butane-1,4-diol diacrylate and 10 parts of an isocyanato-free reaction product of 2 moles of butane-1,4-diol monoacrylate and 1 mole of hexamethylene diisocyanate and also 1 part of benzoin isopropyl ether is subjected in a conventional manner to imagewise exposure through a negative from the side of the photocrosslinkable layer, and is washed out, dried, aftertreated and postexposed in a conventional manner. The relief printing plate thus produced, comprises the layers (P), (Z) and (U). A double sided adhesive sheet 25 μm in total thickness is placed on the base layer (U) and firmly pressed down. The adhesive force of the side of the adhesive sheet fixed to the base layer (U) was 7 N/25 mm. After cutting to size, the printing plate is placed with the relief layer (P) facing downward, the protective sheet (siliconized paper) is peeled off the adhesive layer which has an adhesive force of 1.5 N/25 mm, and the printing plate is mounted on a printing cylinder to a high accuracy of register using registering apparatus customary in the graphic trades. Repeated peeling off and repositioning of the relief printing plate on the printing cylinder is easy and present no problems. After a print run of 1.2 million in the press the relief plate is detached from the printing cylinder for storage and reuse. Removal from the printing cylinder is easily achieved without damaging or destroying the relief printing plate by bending or stretching. For storage the adhesive layer of the printing plate can be covered up with siliconized paper or a protective sheet. Even after a second, third and fourth assembling and printing sequence the adhesive force of the base layer of the multilayer relief printing plate is sufficient to ensure satisfactory printing conditions and easy removal and reuse of the plates.

EXAMPLE 2

A laminate of the structure described in Example 1 is provided on the side of the base (U) remote from the interlayer (Z) with a 10 μm thick adhesive layer. This adhesive layer has an adhesive force of 4 N/25 mm and is covered with a protective sheet which transmits actinic light. After exposure of the photocrosslinkable layer, washing out, drying and aftertreatment, the protective sheet is peeled off the adhesive layer of the plate, and the plate is fixed to the printing cylinder as described in Example 1. In this case too, assembly and disassembly are carried out without damage to the plate. In the press, the plate performs satisfactorily without detachment of the plate from the printing cylinder during printing (length of run > 800,000 copies). After the printing plate had been peeled off the printing cylinder the adhesive layer was again covered with a protective sheet or paper and stored for 4 months. The performance on reuse for printing was satisfactory even after this period.

EXAMPLE 3

Example 1 was repeated as regards using a double sided adhesive sheet (W) having different adhesive forces on the two sides, and Example 2 as regards applying an adhesive layer to the base layer (U) in the course of production, except that the adhesive force of the adhesive layer to be bonded to the printing cylinder was in each case 6 N/25 mm.

The plates were measured in respect of closeness to specifications, and for the plate area of 762 × 1200 mm a size variation of ±10 μm was found. After the plates had been mounted on the printing cylinder, a customary gray wedge which served as the original was printed distributed over the entire plate with minimal contact pressure. The printed image was of excellent quality; there was no sign of holes or flaws which result in an increased contact pressure and hence in deformation of fine-line printing elements.

COMPARATIVE EXAMPLE

First a laminate was copied with the gray wedge mentioned in Example 3 and washed out, dried, postexposed and aftertreated. The printing plate thus obtained has a size variation of ±10 μm. The printing cylinder was covered with a customarily used double-sided adhesive sheet (total thickness 0.5 mm; adhesive force: 15 N/25 mm; size variation: ±25 μm). In trying to fit the plate to a high accuracy of register using the registering apparatus, the occasionally necessary removal and repositioning of the plate is only possible with some effort. It is true that a print run of 1.2 million was performable without problems, but the printed gray wedge exhibited a nonuniform appearance as a consequence of the larger size variations of the adhesive sheet and as a consequence of unevenness in the plate structure, so that it was necessary to use a higher contact pressure which had an adverse effect on quality.

Removing the plate from the printing cylinder was not possible without stretching the plate, so that the interlayer (Z) contained visible creases, and reuse was not possible.

We claim:

1. In a multilayer flexographic relief printing plate which comprises the following layers firmly adhered to each other in the following order:
   (i) a relief layer (P) prepared by imagewise irradiation with actinic light of a photopolymerizable layer containing the following components:
      (a) from 50 to 99% by weight of an elastomer,
      (b) from 1 to 50% by weight of one or more photopolymerizable olefinically unsaturated monomers substantially compatible with said elastomer,
      (c) and from 0.01 to 10% by weight of photoinitiator; followed by washing out the non-irradiated and thus nonphotopolymerized parts of said photopolymerizable layer with a developer solvent, thereby obtaining said relief layer (P);
   (ii) a first adhesion promoting layer;
   (iii) a interlayer (Z) which is insoluble in and impermeable to the developer solvent used in preparing the relief layer (P) and the printing ink solvents;
   (iv) a second adhesion promoting layer; and
   (v) a base layer (U) containing an elastomeric material; the improvement which comprises:
   (vi) a doublesided adhesive sheet (W) which transmits actinic light and which on one side is firmly bonded to the base layer (U) and which has on the other side a contact adhesive layer having an adhesive force of from 1 to 6 N/25 mm, the sheet having a higher adhesive force on the side bonded to the base layer (U), whereby the multilayer flexographic relief printing plate can be repeatedly adhered to and removed from a printing cylinder without damaging or destroying the plate.

2. The reusable multilayer flexographic relief printing plate of claim 1, wherein the double-sided adhesive sheet is from 5 to 100 μm in thickness.

3. The reusable multilayer flexographic relief printing plate of claim 2, wherein the double-sided adhesive sheet is from 10 to 50 μm in thickness.

* * * * *